US012730189B2

(12) United States Patent
Skow et al.

(10) Patent No.: US 12,730,189 B2
(45) Date of Patent: Sep. 8, 2026

(54) CFAR ADAPTIVE PROCESSING FOR REAL-TIME PRIORITIZATION

(71) Applicant: Zadar Labs, Inc, Santa Clara, CA (US)

(72) Inventors: Joshua Skow, San Francisco, CA (US); Ali Mostajeran, Morgan Hill, CA (US); Mohammad Emadi, San Jose, CA (US)

(73) Assignee: Zadar Labs Inc., Campbell, CA (US)

(*) Notice: Subject to any disclaimer, the term of this patent is extended or adjusted under 35 U.S.C. 154(b) by 622 days.

(21) Appl. No.: 18/170,211

(22) Filed: Feb. 16, 2023

(65) Prior Publication Data

US 2023/0258772 A1 Aug. 17, 2023

Related U.S. Application Data

(60) Provisional application No. 63/268,143, filed on Feb. 17, 2022.

(51) Int. Cl.
*G01S 7/41* (2006.01)
*G01S 13/56* (2006.01)

(52) U.S. Cl.
CPC .............. *G01S 7/412* (2013.01); *G01S 7/415* (2013.01); *G01S 13/56* (2013.01); *G01S 7/414* (2013.01)

(58) Field of Classification Search
CPC .......... G01S 7/412; G01S 7/415; G01S 13/56; G01S 7/414; G01S 7/2922; G01S 13/582
See application file for complete search history.

(56) References Cited

U.S. PATENT DOCUMENTS

2013/0201054 A1* 8/2013 Wang .................. G01S 13/5246 342/93
2021/0200209 A1* 7/2021 Mostajeran ........... G01S 13/931
2024/0428596 A1* 12/2024 Parikh ..................... G06T 7/246

* cited by examiner

*Primary Examiner* — Brady W Frazier
*Assistant Examiner* — Ismaaeel A. Siddiquee
(74) *Attorney, Agent, or Firm* — UTULAW PC

(57) ABSTRACT

Disclosed herein are systems and methods for adaptive CFAR detection and prioritization of objects in an environment. The system can select a cell under test (CUT) and an associated feature set of the cell. A CFAR detection threshold may be determined based on the feature set. The CUT is compared with its neighboring cells to determine whether an object is detected based on the CFAR detection threshold. The detected object is grouped by feature set and compared to a figure of merit (FOM) threshold to generate a priority score. Scored detected objects are sorted to generate a prioritized list of detected objects. The CFAR detection threshold and/or FOM threshold is dynamically updated based on the prioritized list of detected objects.

20 Claims, 13 Drawing Sheets

CFAR ADAPTIVE PROCESSING FOR REAL-TIME PRIORITIZATION

CROSS-REFERENCES TO RELATED APPLICATIONS

The present application claims priority to U.S. provisional application No. 63/268,143, filed Feb. 17, 2022, and entitled "CFAR ADAPTIVE PROCESSING FOR REAL-TIME PRIORITIZATION," which is hereby incorporated herein in its entirety for all purposes.

FIELD OF ART

This disclosure relates to systems and methods for real-time detection, prioritization, and processing of objects in an environment in radar processing.

BACKGROUND

In radar processing, radar data requires significant data processing to distinguish between real objects in the environment and noise which may look like a real object. Constant false alarm rate (CFAR) filtering is a technique which determines which objects are real by comparing a Cell Under Test (CUT) to its neighboring cells in a data matrix. CFAR techniques are effective at distinguishing relatively higher value points from lower value points, but fast processing speed of CFAR filtering is critical so that an entire raw data scan can be evaluated within a reasonable amount of time. Thus, CFAR techniques can present the following tradeoffs: 1) spend more time on CFAR filtering to produce higher accuracy in distinguishing between real objects and noise, and 2) spend less time in CFAR filtering but output more noise to the rest of the processing chain.

Conventional approaches to CFAR techniques can yield detection results that face a variety of quality related shortcomings. For example, setting a high CFAR threshold may effectively remove noise and make it unlikely for an object detection system to run out of processing time. But setting such a strict filter would also exclude valid objects that should otherwise have been detected. Another example is to change the way objects are filtered by applying a different CFAR algorithm, but quality of the results is still compromised by the limitations of the particular CFAR algorithm selected. In yet another example, points (e.g., cells under test) would not be prioritized and the system would attempt to process as many points as possible within the time allotted. All of these approaches can result in omission of important data points and/or inefficient use of processing time.

CFAR filtering results may be used by environmental perception systems, such as automated vehicle systems. Automotive perception sensors (e.g., automotive radar) have two fundamental requirements. One is to provide accurate data reflecting the external world. Secondly, they must provide data in a timely fashion for higher level perception systems to make appropriate operating decisions. Another key limitation relating to automotive radar is the link budget of the receiver antenna. Due to differences in received power between objects at different ranges and dopplers, multiple types of thresholds may be required to detect two valid objects in different conditions. For example, a human at long range will have a much lower power signal received than a car at short range, but both are valid objects which should be detected. Accordingly, it is desirable to provide improved CFAR processing techniques.

SUMMARY

The present invention is for systems and methods for detecting and prioritizing processing of objects in an environment in radar signal processing. An example system and method may utilize adaptive processing of a CFAR algorithm to intelligently prioritize objects during the object filtering process, when system-level or platform-level constraints, such as time constraints, restrict which objects to process in an environment. An adaptive CFAR threshold is determined based on one or more detections (e.g., from a previous radar scan) and/or feature characteristics associated with a detected object. The adaptive CFAR threshold is utilized to detect whether an object in an environment is detected or not detected. The adaptive CFAR threshold may be dynamically updated based on detection results from previous radar scans through the system.

Detected objects are sorted into groups defined by a feature and an adaptive figure of merit threshold. The adaptive figure of merit threshold can represent a confidence level of the quality of the detection. The adaptive figure of merit threshold may be dynamically updated based on prioritized detection results from previous radar scans through the system. The adaptive figure of merit threshold is used to prioritize the detected objects, such that system-level constraints (e.g., timing constraint) and platform-level constraints (e.g., quality requirements) can be met when determining which objects to process first in a dynamic environment.

In some aspects, the techniques described herein relate to a radar system for performing object detection on a cell under test (CUT) associated with range-Doppler radar values, including: a computing device processor; and a memory device including instructions that, when executed by the computing device processor, enables the radar system to: determine a feature set for the cell under test, the cell under test associated with a plurality of cells, the feature set specifying parameter data including at least one of range data, doppler data, SNR data, noise data, or power data; select a baseline detection threshold based on the feature set; analyze parameter data associated with the cell under test with respective parameter data associated with neighboring cells to generate detected unit data indicative of an object detection; compare the detected unit data to a detection threshold to detect an object; compare the detected unit data to a figure of merit to generate a priority score; assign the priority score to the detected unit data; sort the detected unit data based on the priority score to generate a sorted list of detected unit data; update the baseline detection threshold based on the sorted list; and use the feature set associated with the sorted list of detected unit data for further processing.

In some aspects, the techniques described herein relate to a radar system, wherein the figure of merit is updated based on radar system constraints including environment considerations for updating the figure of merit and threshold.

In some aspects, the techniques described herein relate to a radar system, wherein the radar system constraints include one of a time constraint or quantity.

In some aspects, the techniques described herein relate to a radar system, wherein one of the baseline detection threshold or the figure of merit is updated to satisfy a system performance metric.

In some aspects, the techniques described herein relate to a radar system, wherein the system performance metric includes an amount detected objects.

In some aspects, the techniques described herein relate to a radar system wherein the instructions, when executed by the computing device processor, further enables the radar system to: process detected unit data satisfying a priority score threshold.

In some aspects, the techniques described herein relate to a radar system wherein the instructions, when executed by the computing device processor, further enables the radar system to: use a machine learning based approach to determine the baseline detection threshold for the feature set.

In some aspects, the techniques described herein relate to a computer-implemented method for performing object detection using a radar system on a cell under test associated with range-Doppler radar values, including: obtaining radar data for performing object detection on a cell under test (CUT), the radar data associated with range-Doppler radar values; determining a feature set for the cell under test, associated with multiple cells, the feature set specifying parameter data including at least one of range data, doppler data, SNR data, noise data, or power data; selecting a baseline detection threshold based on the feature set; analyzing parameter data of the cell under test and neighboring cells to generate detected unit data indicating object detection; detecting an object by comparing the detected unit data to the baseline detection threshold; generating a priority score by comparing the detected unit data to a figure of merit; assigning the priority score to the detected unit data; sorting the detected unit data based on the priority score to form a sorted list; and updating the baseline detection threshold using the sorted list.

In some aspects, the techniques described herein relate to a computer-implemented method, further including: updating the figure of merit based on radar system constraints including environment considerations for updating the figure of merit and threshold.

In some aspects, the techniques described herein relate to a computer-implemented method, wherein the radar system constraints include one of a time constraint or quantity.

In some aspects, the techniques described herein relate to a computer-implemented method, further including: updating one of the baseline detection threshold or the figure of merit to satisfy a system performance metric.

In some aspects, the techniques described herein relate to a computer-implemented method, wherein the system performance metric includes an amount detected objects.

In some aspects, the techniques described herein relate to a computer-implemented method, further including: processing detected unit data satisfying a priority score threshold.

In some aspects, the techniques described herein relate to a computer-implemented method, further including: using a machine learning based approach to determine the baseline detection threshold for the feature set.

In some aspects, the techniques described herein relate to a non-transitory computer readable storage medium storing instructions that, when executed by at least one processor of a computing system, causes the computing system to: obtain radar data for performing object detection on a cell under test (CUT), the radar data associated with range-Doppler radar values; determine a feature set for the cell under test, associated with multiple cells, the feature set specifying parameter data including at least one of range data, doppler data, SNR data, noise data, or power data; select a baseline detection threshold based on the determined feature set; analyze parameter data of the cell under test and neighboring cells to generate detected unit data indicating object detection; detect an object by comparing the detected unit data to the detection threshold; generate a priority score by comparing the detected unit data to a figure of merit; assign the priority score to the detected unit data; sort the detected unit data based on the priority score to form a sorted list; and update the detection threshold using the sorted list of detected unit data.

In some aspects, the techniques described herein relate to a non-transitory computer readable storage medium, wherein the instructions, when executed by the at least one processor, further enables the computing system to: update the figure of merit based on radar system constraints including environment considerations for updating the figure of merit and threshold.

In some aspects, the techniques described herein relate to a non-transitory computer readable storage medium, wherein the radar system constraints include one of a time constraint or quantity.

In some aspects, the techniques described herein relate to a non-transitory computer readable storage medium, wherein the instructions, when executed by the at least one processor, further enables the computing system to: update one of the baseline detection threshold or the figure of merit to satisfy a system performance metric.

In some aspects, the techniques described herein relate to a non-transitory computer readable storage medium, wherein the system performance metric includes an amount detected objects.

In some aspects, the techniques described herein relate to a non-transitory computer readable storage medium, wherein the instructions, when executed by the at least one processor, further enables the computing system to: process detected unit data satisfying a priority score threshold.

One benefit of the present invention is intelligently prioritizing the signal processing chain such that under constraints (e.g., timing and quality), points would not be dropped randomly or dropped in a priority order that is not ideal. For example, using range as the selected feature set, prioritizing detected objects using an adaptive CFAR processing system and method would avoid the result where objects which are further away would otherwise be dropped while only nearby objects are preserved to meet timing constraints. Thus, the system and method can intelligently filter objects in an environment such that detected objects are processed in order of the most important detections.

Various other functions and advantages are described and suggested below as may be provided in accordance with the various embodiments.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
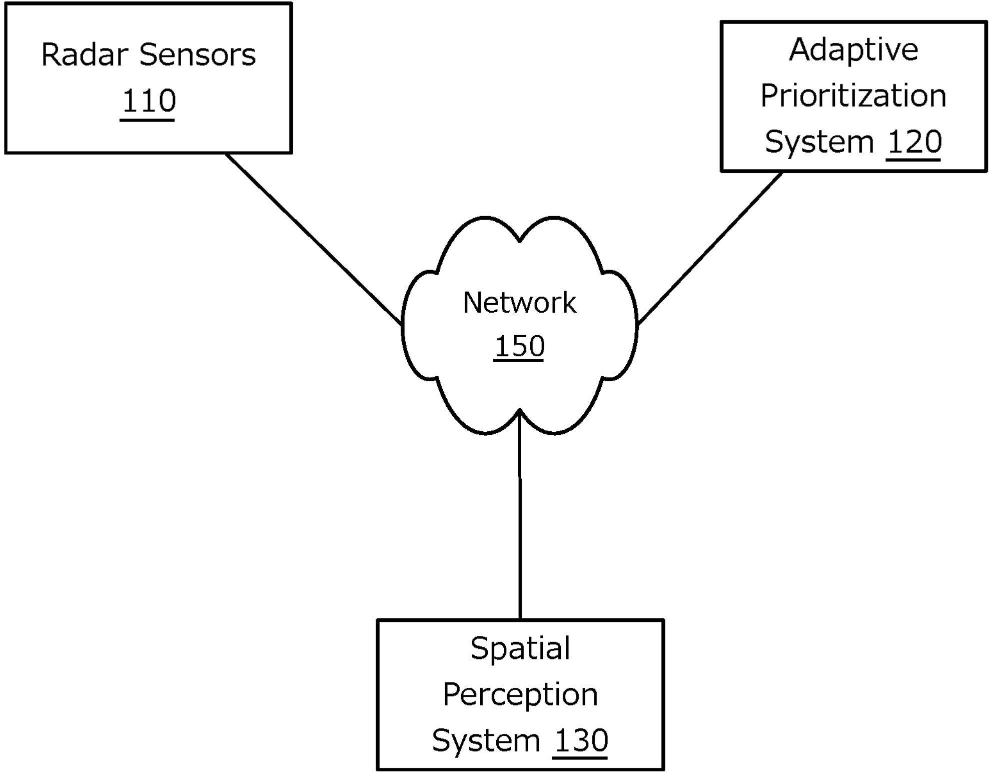
FIG. 1 illustrates an environment for adaptive prioritization of radar signal processing in accordance with an embodiment of the invention.

The inventive system and method (hereinafter sometimes referred to more simply as "system" or "method") described herein relates to adaptive detection and prioritization of radar signal processing. In certain embodiments, the system can select a cell under test (CUT), from which to collect data associated with the cell in a two-dimensional region of a range-Doppler map. Each cell may be associated with cell data (e.g., parameter data), which includes features. A feature is a defining characteristic of an object, such as range, Doppler level, geometric location, noise, signal-to-noise ratio (SNR), power, among others, or any combination thereof. Selection of a feature set(s) may be determined based on the environment, the needs of an application utilizing the system (e.g., a system state), and so forth.

A CFAR threshold (e.g., detection threshold) based on the feature set is selected to determine whether an object is valid or invalid (e.g., detected or non-detected). The cell under test is compared with its neighboring cells based on the selected CFAR threshold. Different feature sets may require different CFAR thresholds, for example, in an application where objects are grouped into Doppler sets, Doppler is selected as the feature set, and an appropriate CFAR threshold for handling objects by Doppler values is determined. In an embodiment, an object is detected when signal from the cell is above the CFAR threshold.

A figure of merit threshold is selected to prioritize the detected objects. The adaptive figure of merit threshold may quantify a confidence level of the detection. For example, a figure of merit threshold may be set as the average of Doppler levels of all objects detected in a previous scan (e.g., previous scan average). Objects may be sorted into groups (e.g., buckets) defined by the feature set and the figure of merit threshold. In the example, cells with a Doppler level above the figure of merit threshold (e.g., greater than the average Doppler level) would be sorted into a first bucket, while cells with a Doppler level below the FOM threshold (e.g., lower than the average Doppler level) would be sorted into a second bucket.

The object is compared to the figure of merit threshold and assigned a score. A scheduler may weigh various factors in prioritizing the scored detected objects, such as the order of buckets to process (e.g., by feature, by figure of merit, etc.), weighted buckets, by volume of points to process in each bucket, among others. The resulting prioritized list of detected objects is passed to other systems, such as driver assistance systems, automotive imaging systems, etc., for further processing. In certain embodiments, the prioritized list of detected objects is fed back into the system to dynamically update the CFAR threshold and/or figure of merit threshold. Dynamically updating the CFAR threshold and/or figure of merit threshold can improve the quality and accuracy of subsequent radar scans by the system in a constantly changing environment.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

FIG. 1 illustrates an environment for real-time prioritization of radar signal processing of objects in accordance with an exemplary embodiment of the invention. The environment may comprise radar sensors 110, adaptive prioritization system 120, spatial perception system 130, and network 150. Radar sensors 110, adaptive prioritization system 120, spatial perception system 130, and network 150 may be on a single system. In another embodiment, they may be on a distributed system.

Radar sensors 110 can collect signal data of objects in an environment. Radar sensors 110 may comprise radar systems known in the art for receiving radar signals. This may include automotive radar systems, such as receiver antennas associated with automated driving systems, and so forth.

Adaptive prioritization system 120 may detect objects in an environment and prioritize the detected objects. A prioritized list of detected objects may be passed to spatial perception system 130 for further processing. In an embodiment, adaptive prioritization system 120 selects a cell under test (e.g., CUT) to compare with nearby range-Doppler power values of neighboring cells. A feature set is selected for the CUT. Each cell may have a set of associated data (e.g., features). A feature may include a defining characteristic of an object, such as range, Doppler, geometric location, noise, signal-to-noise ratio (SNR), vehicle speed, among others, or any combination thereof. Selection of the feature set(s) may be determined based on the environment, predetermined by particular requirements of an application utilizing the system, and so forth.

The adaptive prioritization system 120 determines a detection threshold (e.g., CFAR threshold) based on the feature set. By considering a feature definition within the CFAR algorithm, data points can be grouped by their feature, per point characteristics, and system-wide information, which can be cross-correlated with that feature. For example, Doppler may be selected as the feature set, and objects are processed through a CFAR algorithm based on their Doppler levels. An array of Doppler classes may be defined to classify detected objects (e.g., a first Doppler class may represent objects having a Doppler level of 0 to 25, a second Doppler class may represent objects having Doppler level of 26 to 50, and so forth). Objects that fall within each Doppler class may be evaluated against the detection threshold to determine whether each object can be detected or not detected against the detection threshold. At this stage, the adaptive prioritization system 120 may output an intermediary list of detected objects classified into each Doppler class.

Adaptive prioritization system 120 may utilize a figure of merit (FOM) threshold (e.g., prioritization threshold) to statistically sort the processed objects. In particular, the system may compare feature set values of each object against the FOM threshold, to prioritize the detected object list. The figure of merit threshold can be a value determined based on the feature set. The FOM threshold may be a default threshold, or may be determined based on tracking the FOM threshold from previous radar scans. Each detected object may be grouped into data buckets relative to the FOM threshold. For example, a FOM threshold may be set as the average of Doppler levels of all objects detected in a previous scan (e.g., previous scan average). Data points with a Doppler level above the FOM threshold (e.g., greater than the average Doppler level) would be sorted into a first bucket, while data points with a Doppler level below the FOM threshold (e.g., lower than the average Doppler level) would be sorted into a second bucket.

In certain embodiments, adaptive prioritization system 120 may sort the buckets into a prioritized list and pass the prioritized list to spatial perception system 130 for further processing. Prioritization may be determined based on system level and/or platform level constraints. For example, a prioritized list may sort the FOM buckets in the following order: first Doppler class with high FOM, second Doppler class with high FOM, first Doppler class with low FOM, second Doppler class with low FOM, etc. By prioritizing selection of points from all of the buckets having feature set values (for example, Doppler level) higher than the FOM threshold, adaptive prioritization system 120 is able to process data from across multiple feature sets and only drop lower priority points distributed across feature sets, such as during time constraints.

According to certain embodiments, the performance of the system's processing of the points in a current iteration can be used to update the detection threshold and/or FOM threshold in subsequent iterations. When a set of points have been processed by adaptive prioritization system 120, the quality of the detected object list and/or prioritized object list is evaluated and fed back into the system, along with passing the original data points to be processed under the updated threshold value(s). In another embodiment, the detection threshold and/or FOM threshold may be updated based on the expected or desired performance of the system should be in subsequent iterations.

Spatial perception system 130 may comprise systems which can utilize the prioritized list of detected objects in radar signal processing. In an embodiment, spatial perception system 130 may include autonomous vehicle perception systems or other driver assistance systems. In other embodiments, spatial perception system 130 can include other beamforming modules, systems which utilize angle of arrival estimation, among others. For example, a beamforming module can select points from the prioritized list of detected objects and process them in a round robin fashion.

Network 150 may facilitate communication between the radar sensors 110, adaptive prioritization system 120, and spatial perception system 130. In an embodiment, adaptive prioritization system 120 can be within a network (e.g., in communication with or associated with network 150). In another embodiment, adaptive prioritization system 120 can be on the network edge (e.g., contained inside a single radar sensor which is in communication with network 150). Network 150 can be an internal network or on-premises network, the Internet, etc., which allows radar sensors, the adaptive prioritization system 120, and spatial perception system 130 to communicate on the premise (e.g., locally, for example, on an autonomous vehicle). In another example, communication between the components may be facilitated remotely (e.g., relayed to a cloud network). Network 150 may include on-premise databases. The on-premise databases may communicate with each other to collect, sort, store, and/or analyze CFAR data. In another embodiment, network 150 may include an internal data bus (e.g., a bus between a processor and a memory system).

The system may be reorganized or consolidated, as understood by a person of ordinary skill in the art, to perform the same tasks on one or more other servers or computing devices without departing from the scope of the invention.

Figure 2:
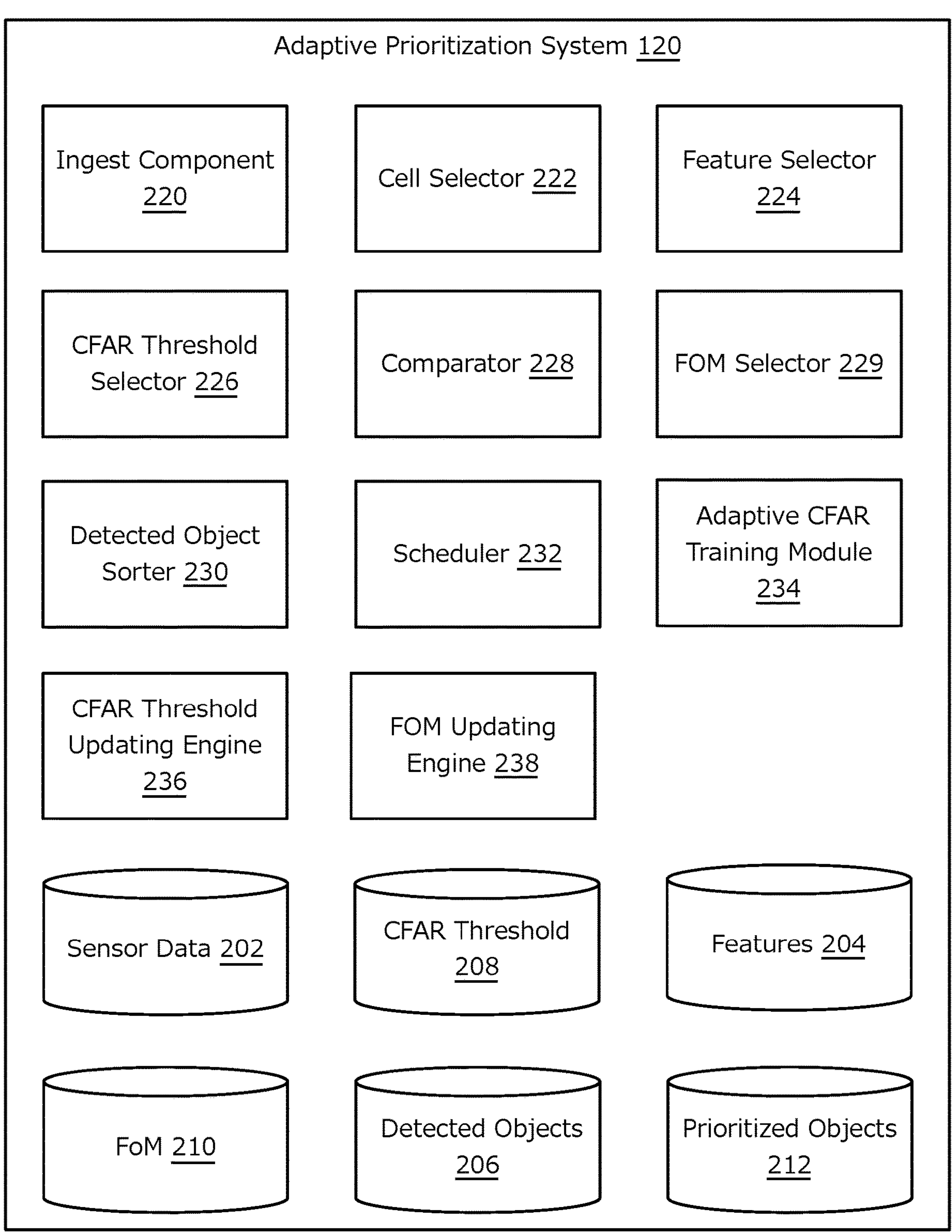
FIG. 2 illustrates components of an exemplary adaptive prioritization system in accordance with an embodiment of the invention.

FIG. 2 illustrates exemplary components of an adaptive prioritization system in accordance with an embodiment of the invention. The adaptive prioritization system may comprise sensor data store 202, feature data store 204, detected objects data store 206, CFAR threshold data store 208, figure of merit (FOM) data store 210, prioritized objects store 212, ingest component 220, cell selector 222, feature selector 224, CFAR threshold selector 226, comparator 228, figure of merit threshold selector 229, detected object sorter 230, scheduler 232, adaptive CFAR training module 234, CFAR threshold updating engine 236, and figure of merit updating engine 238 . . . .

Ingest component 220 can be configurable to receive signal data from objects (e.g., cells or points) in an environment. Signal data may be collected from radar scans through radar sensors (e.g., receiver antenna). The received signal data may be stored in sensor data store 202 or other appropriate data store.

Cell selector 222 is configured to select a cell under test (e.g., CUT), to be compared with its neighboring cells within a raw data matrix. Each cell may be associated with various features. A feature may include a defining characteristic of an object (e.g., range, Doppler, geometric location, noise, signal-to-noise ratio (SNR), vehicle speed, etc., or any combination thereof). A collection of feature types may be stored in feature data store 204.

Feature selector 224 is configurable to determine the parameter(s) by which signal data attributed to a cell should be defined and sorted as they are processed (e.g., for detection). In particular, feature selector 224 selects an appropriate feature set(s) for the selected cell, based on an application of the system. For example, range may be selected as a feature set of the cell. The selected feature set may be further divided into feature subsets (e.g., classes), such as a first range class (e.g., range class 0) associated with objects at range 0-50 meters, a second range class (e.g., range class 1) associated with objects at range 51-100 meters, and so forth. In another embodiment, a plurality of feature sets may be selected. For example, a combined feature set of Doppler and range may be selected.

Upon receiving the signal data, ingest component 220 may classify which feature set and/or feature set class the associated cell under test falls into. In another embodiment, a particular feature may be used as a default feature set. An index of pairings of selected feature set(s) with various applications may be saved in feature data store 204.

CFAR threshold selector 226 can be configured to select a detection threshold for an application of the system. In certain embodiments, the detection threshold may be a CFAR threshold applied to an implementation of a CFAR algorithm in determining whether the cell under test is a valid or invalid object. The detection threshold may be a value representing a power level. Cells emitting signals with a power level below the detection threshold are considered as an invalid object, where cells emitting signals with a power level greater than the detection threshold are considered a valid object. In another embodiment, CFAR threshold selector 226 may be configured to select an appropriate CFAR algorithm for an application of the system. In yet another embodiment, the CFAR threshold may be determined based on previous scans of the signal data (e.g., received sensor data). A default detection threshold may be predetermined based on the selected feature set.

Continuing with the above, the detection threshold can be based on the CFAR algorithm implemented, which can include a linear CFAR algorithm (e.g., CA-CFAR, etc.) or non-linear CFAR algorithm (GO-CFAR, SO-CFAR, OS-CFAR, median filter, geometric mean, etc.) In an embodiment, a linear detector may be utilized as the detection threshold to detect an object. The linear detector may include average filtering and thresholding, spatially adaptive average filtering and thresholding, etc. In an embodiment, a cell averaging CFAR detector can be used as a baseline comparison for one or more CFAR techniques. In an embodiment, a non-linear detector may be utilized as the detection threshold to detect an object. The non-linear detector may include utilizing an order statistic filter (such as a median filter), a CA-CFAR detector, a maximum detector (e.g., GO-CFAR), minimum detector (e.g., SO-CFAR), an expansion order static CFAR detector (e.g., OS-CFAR), among others. In accordance with various embodiments, such example approaches can result in increased precision and recall, resistance to jamming and interferences, and reduced sensitivity to problems caused by multi-path, such as shadow targets.

Linear Detector: Average Filtering and Thresholding

In an embodiment, for detection for a given cell, often termed as the cell under test (CUT), while utilizing cell averaging constant false alarm ratio (CA-FAR), the detection threshold is based on the noise power estimate from the neighboring cells, and detections occur when the signal level exceeds the threshold. In this example, the noise power can be estimated from neighboring cells. The detection threshold, T, can be represented by:

$$T = \alpha P_n \quad \text{EQ (1)}$$

Where P is the noise power estimate and a is a scaling factor called the threshold factor. The threshold factor, α, can be adaptively adjusted to keep the probability of false alarm at a constant. The noise estimate can be computed from both leading and lagging cells (called training cells) around the CUT, with guard cells placed to prevent signal components from leaking into the training cells. In an embodiment, the number of leading and lagging training cells can be the same. The noise estimate can be computed as:

$$P_n = \frac{1}{N}\sum\nolimits_{m=1}^{N} x_m \quad \text{EQ (2)}$$

Where N is the number of training cells and xm is the sample in each training cell. Guard cells can be placed adjacent to the CUT, both leading and lagging it.

The threshold factor, α; number of training cells, and guard cells can be changed adaptively based on factors such as vehicle velocity, distance of targets, previous scans, changes to the noise floor, and others.

Linear Detector: Spatially Adaptive Average Filtering and Thresholding

In an embodiment, the cell-averaging constant false alarm ratio (CA-CFAR) algorithm can be modified by incorporating the power level of the signal as a merit. The algorithm is designed to adapt to the local behavior of the 2D range-Doppler (RD) plane output. In the situation the signal power level is high (or above a threshold), the filter detects it as a signal. However, in the situation the power level is low (or below a threshold), the filter averages the power levels of neighboring cells. More specifically, $$P_S = \frac{1}{M}\sum\nolimits_{i=1}^{M} x_i \quad \text{EQ (3)}$$

$$T = \alpha\left\{1 - \frac{P_n}{P_s}x_{CUT} + \frac{P_n}{P_s}P_n\right. \quad \text{EQ (4)}$$

Where Pn/Ps can represent the average signal-to-noise power within the surrounding cells (e.g., N/m cells). In this embodiment, the filter adapts to the local behavior of the 2-dimensional Range-Doppler (RD) plane output. If there is a sharp change or edge in the RD plane, the local signal variance is much larger than the noise variance, resulting in a small ratio of Pn/Ps and a low threshold, leading to detection of the object.

On the other hand, if Pn/Ps is very large, the threshold becomes negative, indicating that there is no peak in the RD plane. When Pn/Ps is around 1, the algorithm is close to a cell averaging CFAR. The thresholding ranges from two extremes—at high power signals, the algorithm acts as an identity filter, while in flat regions it performs local averaging, as in CA-CFAR. In between, it is a combination of a mean filter (CA-CFAR) and the identity filter. Thus, the detector detects noise in flat regions while allowing high frequency information and high-power signals to remain unchanged from the input to the output of the filter.

Non-Linear Detectors

In accordance with various embodiments, the presence of additive noise in the range-Doppler (RD) plane can pose a challenge to linear detection techniques such as CA-CFAR. This is particularly true in scenarios where interferences from other communication links and radars, or a large presence of background clutter and static objects in the scene, result in the presence of broadband, impulsive noise. In these cases, linear filters or detection techniques may not be appropriate.

In response to the detection of noise satisfying a noise threshold, or the noise is not white noise (broadband), like: jamming, object in presence of clutter, etc., a class of non-linear filters, referred to as order statistic filters, can be utilized. A specific example of such a filter is the median filter. In this example, the median of the noise in the training cells is calculated rather than the average power, providing improved performance in the presence of impulsive noise, albeit at the cost of degraded performance with broadband noise.

In addition to the median filter, other implementations of order statistic thresholding include the max detector, known as Greatest of CFAR (GOCFAR), the min detector known as Smallest of CFAR (SOCFAR), an expansion of this type of thresholding, known as Order static CFAR (OS-CFAR), geometric mean, and the like. These techniques offer increased precision and resistance to jamming and interferences, and reduced sensitivity to problems caused by multipath, such as shadow targets, as compared to linear detectors.

In an embodiment, an expansion of the Order Statistic CFAR (OS-CFAR) algorithm may be implemented for improved performance. In this example, the detection threshold may be determined based on, among others, calculating the power of noise on a plurality of specific trimmed cells (e.g., resulting from training sequences) after sorting the trimmed cells. The calculation may be represented as equations 5 and 6, below:

$$P_n = \frac{1}{(N-\gamma)}\sum\nolimits_{m\epsilon(N-\gamma)} x_m \quad \text{EQ (5)}$$

$$T = \alpha P_n \quad \text{EQ (6)}$$

Where, averaging is performed on cells of the training sequences.

CFAR threshold data store 208 is operable to store various detection thresholds selected for each feature set (e.g., an index of pairings of selected feature set(s) with various detection threshold values). A log of prior selected detection thresholds may also be stored in CFAR threshold data store 208.

In an embodiment, the proposed approach encompasses the utilization of a geometric mean filter as an alternative non-linear filter to the average filtering. It should be noted that any combination of the disclosed approaches may be utilized. Furthermore, an expansion of these techniques may include the implementation of soft thresholding in conjunction with any of the approaches disclosed herein.

Comparator 228 can be configured to compare the cell under test to its neighboring cells in a raw data matrix. Comparator 228 determines whether a cell passes or fails the selected detection threshold. That is, whether the signal (e.g., power level) from the cell under test is above or below the selected detection threshold power level. Cells whose signal exceeds the detection threshold are considered detected objects. In an embodiment, comparator 228 may output an intermediate list of detected objects, which can be passed to scheduler 230 to prioritize the detected object list. The detected objects list may be stored in detected objects data store 206.

Figure of merit (FOM) threshold selector 229 selects a figure of merit threshold for prioritizing the detected objects. A figure of merit threshold may be a default value based on the feature set. In another embodiment, the figure of merit threshold may be determined based on an average value of the objects detected from a radar scan or a plurality of radar scans (e.g., the average Doppler value of all objects detected within a predetermine number of radar scans). In yet another embodiment, the figure of merit threshold may an optimal value based on the values calculated from previous scans fed through the system. The figure of merit values may be stored in figure of merit data store 210. An index of pairings of figure of merit thresholds with a corresponding feature set may also be stored in figure of merit data store 210.

Detected object sorter 230 may group the detected objects in the detected object list by feature set and selected FOM. Specifically, the detected objects may be sorted into buckets. Buckets may be defined by feature and/or the selected figure of merit threshold. For example, an average Doppler level (e.g., of a predetermined number of previous radar scans of objects) may be selected as the figure of merit threshold. Points (e.g., cells whose signals are) greater than the average Doppler level would be sorted into a first bucket, and points with a Doppler level lower than the average Doppler level would be sorted into a second bucket. Detected object sorter 230 may place each detected object into a corresponding bucket, and pass the resulting bucket array of sorted detected objects to scheduler 230 for prioritization.

Scheduler 232 is operable to prioritize the detected objects. Scheduler 230 may assign a score to each object in each bucket, based on its signal power relative to the selected figure of merit. Thus, the score assigned may be based on the feature set and/or whether the detected object measures below or above the figure of merit threshold. For example, scores may correspond to a predetermined hierarchy. An example hierarchy may include as prioritizing the buckets first by priority of feature set, followed by priority of the figure of merit. For example, a first bucket may be defined by a first feature (e.g., range from 0-50 meters) and high figure of merit; a second bucket may be defined as the same feature (e.g., range from 0-50 meters) and low figure of merit; a third bucket may be defined as a lower priority feature (e.g., range from 51-100 meters) and high figure of merit; and a fourth bucket may be defined as the same lower priority feature (e.g., range from 51-100 meters) and low figure of merit. In this example, scheduler 232 may rank the buckets in the following priority: first bucket, second bucket, third bucket, and fourth bucket. In another embodiment, scheduler 232 may prioritize the objects by priority of feature set and figure of merit simultaneously. Thus, the buckets may be ranked in the following priority instead: first bucket, third bucket, second bucket, and fourth bucket. The final output of the adaptive prioritization system 120 may include a prioritized list of detected objects. This list may be stored in prioritized objects data store 212.

Once the points (e.g., detected objects) are sorted into various buckets based on their feature set and the selected figure of merit threshold, the prioritized list of detected objects may be passed to spatial perception system 130 for further processing.

Adaptive CFAR training module 234 may be operable to train the adaptive prioritization system 120 by utilizing results of previous radar scans to optimize the detection threshold and/or figure of merit threshold for a feature set(s). In certain embodiments, the detection threshold and/or figure of merit threshold may be optimized based on evaluating the quality of the list of detected objects and/or the prioritized list of detected objects (e.g., performance of the system) within the selected feature set. Previous scans of objects may be fed back into the system over a specific number of iterations until the thresholds are refined (e.g., increase accuracy of the detections and prioritization of detections under system or platform constraints, such as time constraints).

Adaptive CFAR training module 234 may train CFAR threshold updating engine 236 and/or figure of merit updating engine 238 to dynamically update the detection threshold or figure of merit threshold, respectively. CFAR threshold updating engine 236 may determine an optimized value, an averaging, or other calculated statistical value, of the detection threshold, based on detected objects list in detected objects store 206 collected from previous iterations of a radar scan of a particular set of points for a particular feature set. For each iterative radar scan of the current set of objects or subsequent sets of objects associated with a feature set, CFAR threshold updating engine 236 may update its detection threshold with the calculated statistical value. Likewise, figure of merit updating engine 238 may determine an optimized value, an averaging, or other calculated statistical value, of the figure of merit threshold, based on prioritized lists of detected objects in prioritized objects store 212 collected from previous iterations of a radar scan of a particular set of points for a particular feature set and figure of merit. For each iterative radar scan of the current set of objects or subsequent sets of objects associated with a feature set and figure of merit, figure of merit updating engine 238 may update its figure of merit threshold with the calculated statistical value.

Figure 3:
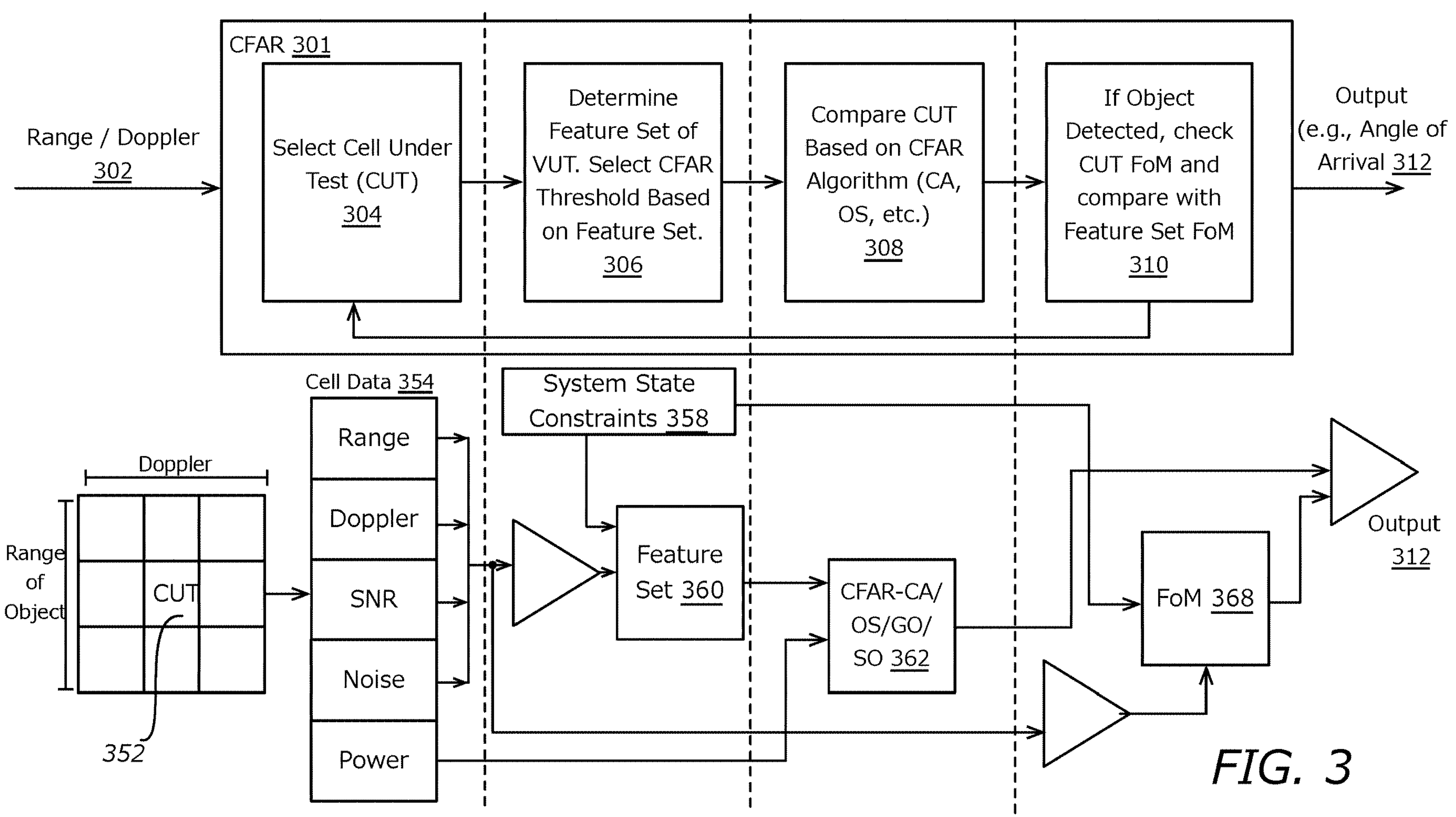
FIG. 3 illustrates an example of the adaptive prioritization system in accordance with an embodiment of the invention.

FIG. 3 illustrates an example of an adaptive CFAR prioritization system 301 in accordance with an embodiment of the invention. In an embodiment, the adaptive CFAR prioritization system 301 receives range/Doppler data 302 from an environment. The system selects 304 a cell under test 352 from the environment. For example, the system may receive a power value associated with the cell under test (e.g., CUT) 352 in a two-dimensional region of a range-Doppler map. The cell may be associated with cell data 354 (e.g., parameter data), which includes features. A feature is a defining characteristic of an object, such as range, Doppler level, geometric location, noise, signal-to-noise ratio (SNR), among others, or any combination thereof.

The system determines 306 a feature set(s) of the cell under test. The feature set is determined by the application of the system, and may be influenced by system state constraints 358. System state constraints 358 may include factors which affect the processing of the system, such as cycle time for processing object detection. In an example, for an application which requires power values for each antenna at a given range and Doppler, the system may determine the feature set 360 is a set of range and Doppler values associated with the cell under test. In another example, if the system state constraints 358 requires segmenting objects by range, then a range-based feature may be determined to be the appropriate feature set.

Once a feature set(s) has been determined, the system may select a detection threshold (e.g., CFAR threshold). The detection threshold is a value determined based on the feature set, which will be used to compare the cell under test with its neighboring cells, to determine whether the cell under test originates from a valid or invalid object. In certain embodiments, the detection threshold may be a CFAR threshold applied to an implementation of a CFAR algorithm in determining whether the cell under test is a valid or invalid object. The detection threshold may be a value representing a power level. Cells emitting signals with a power level below the detection threshold are considered as an invalid object, where cells emitting signals with a power level greater than the detection threshold are considered a valid object. The detection threshold may be determined based on previous scans of the range/Doppler data. A default detection threshold may be predetermined based on the selected feature set. For example, one value may be used as the detection threshold where the feature set is range, while another value may be used as the detection threshold where the feature set is Doppler. Further, yet another value may be used as the detection threshold where the feature set is a combination of range and Doppler.

The system proceeds to compare 308 the cell under test with its neighboring cells. The comparison analysis of the cell under test depends on the CFAR algorithm 362 implemented. For example, a cell under test may be analyzed differently under CA-CFAR, OS-CFAR, GO-CFAR, SO-CFAR, etc. Once selected, the appropriate CFAR algorithm may receive data associated with the power level of the cell and compare it against the neighboring cells accordingly and against the selected detection threshold.

Where an object is detected, the system prioritizes the detected object by comparing 310 a figure of merit of the cell under test with the feature set figure of merit (e.g., figure of merit threshold 368). In an embodiment, the figure of merit of the cell under test (e.g., CUT FOM) may be the power level associated with the cell under test. The figure of merit threshold may be a value based on an average value, an optimized value, or other calculated statistical value based on previous scans of the cell under test. System state constraints 358 may affect the value of the figure of merit threshold, such as cycle time for processing object detection.

A priority score may be assigned to the cell based on whether its power level (e.g., CUT FOM) is above or below the figure of merit threshold. The system arranges cells by their priority score, and the resulting prioritized list of detected objects is passed to further processing, for example, to be used in angle of arrival estimation 312. The resulting prioritized list may also be fed back into the system, where a collection of prioritized lists from previous iterations of radar scans may be used to determine an optimal, average, or other calculated statistical value to update the detection threshold and/or figure of merit threshold for subsequent scans.

Figure 4:
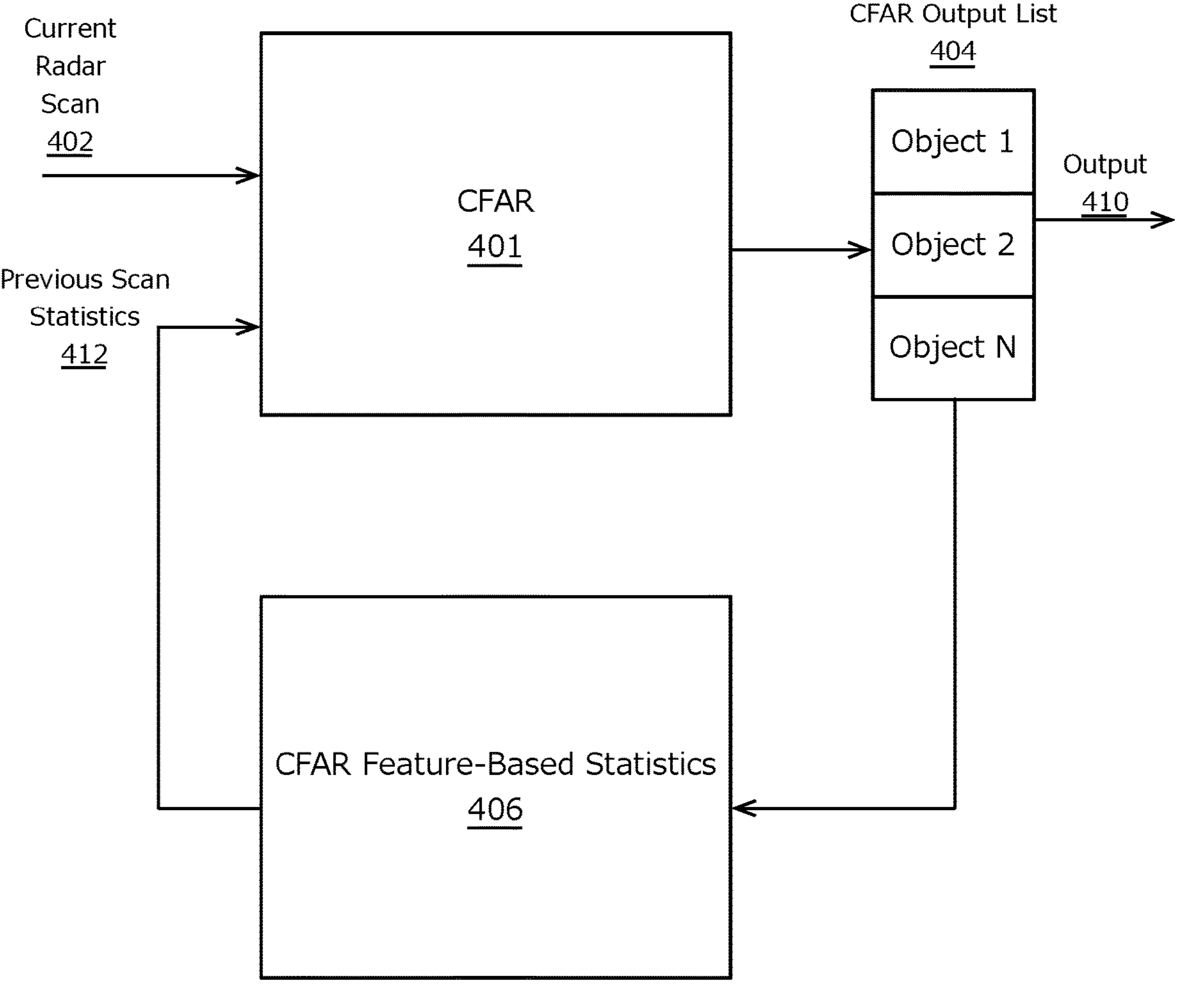
FIG. 4 illustrates an example of dynamically updating a detection threshold and/or figure of merit threshold of an adaptive prioritization system in accordance with an exemplary embodiment of the present invention.

FIG. 4 illustrates an example of dynamically updating the detection threshold and/or figure of merit threshold of an adaptive prioritization system in accordance with an exemplary embodiment of the present invention. The example comprises the CFAR adaptive prioritization system 401, a CFAR output list 404, CFAR feature-based statistics 406, current radar scan 402, previous scan statistics 412, and angle of arrival processing 410.

In an embodiment, a current radar scan 402 may be received by the CFAR adaptive prioritization system 401. The current radar scan may include signal data received from objects (e.g., cell under test) in an environment. The current radar scan 402 may be collected through radar sensors (e.g., receiver antenna).

The CFAR adaptive prioritization system 401 can be configurable to process the signal data and prioritize detected objects. In an embodiment, CFAR adaptive prioritization system 401 can select a cell under test (e.g., CUT) to process. A feature set associated with the cell under test is determined and selected based on, for example, a preconfigured setting or system level and/or platform level constraints, etc. A detection threshold (e.g., CFAR threshold) is selected based on the feature set. The appropriate CFAR algorithm may also be selected based on the feature set and/or system level constraints (e.g., cycle time for processing) and/or platform level constraints (e.g., speed of an autonomous vehicle, quality requirements, etc.). The cell under test is compared with neighboring cells, based on the CFAR algorithm and the selected detection threshold, to determine whether it is a valid or invalid object (e.g., whether there is detection or non-detection). A collection of detected objects may be grouped by feature set. For example, detected objects associated with a first range class (e.g., 0-50 meters) may be sorted into a first group, detected objects associated with a second range class (e.g., 51-100 meters) may be sorted into a second group, and so forth.

When an object is detected and sorted by feature set (or feature set class), CFAR adaptive prioritization system 401 compares the object with a figure of merit threshold. The figure of merit threshold may be determined by CFAR feature-based statistics 406, discussed in further detail below. In an embodiment, a figure of merit of the cell under test may be a power level associated with the cell. The cell's power level may be compared with the figure of merit threshold. The object is assigned a score based on the cell's power level relative to the figure of merit threshold. The scored detected objects are then arranged under a hierarchy, resulting in CFAR output list (e.g., a prioritized list of objects) 404 for further processing (e.g., for angle of arrival processing 410, among other beamforming modules).

CFAR feature-based statistics 406 is configurable to evaluate the prioritized list of detected objects (e.g., CFAR output list 404) to dynamically update the detection threshold and/or figure of merit threshold for subsequent radar scans. In an example, the CFAR feature-based statistics 406 may collect a CFAR output list 404 from previous scans. CFAR feature-based statistics 406 may using machine learning to determine an average value of the objects detected from a plurality of radar scans (e.g., the average Doppler value of all objects detected within a predetermine number of radar scans), an optimal value for the radar scans given the selected feature set, and so forth. Previous scan statistics 412 are fed back into CFAR adaptive prioritization system 401, by a baseline number of iterations. The resulting average Doppler of the set of previous scan statistics 412, optimal Doppler, or other calculated statistical value thereof, may be used to update the detection threshold and/or the figure of merit threshold.

Figure 5:
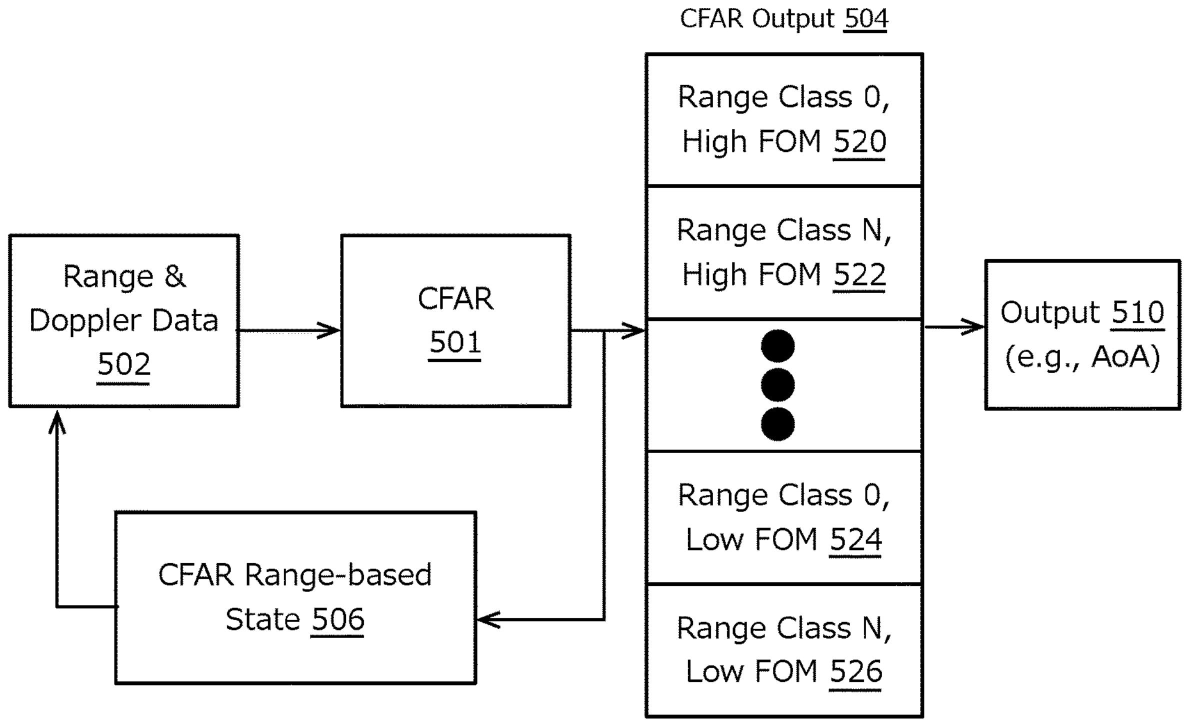
FIG. 5 illustrates another example of dynamically updating a detection threshold and/or figure of merit threshold of an adaptive prioritization system in accordance with an exemplary embodiment of the present invention.

FIG. 5 illustrates another example of dynamically updating a detection threshold and/or figure of merit threshold of an adaptive prioritization system in accordance with an exemplary embodiment of the present invention. The example comprises range and Doppler data 502, CFAR adaptive prioritization system 501, CFAR detection output 504, CFAR range-based state 506, and output processing block 510 (e.g., angle of arrival processing).

In certain embodiments, range and Doppler data from an environment may be received by CFAR adaptive prioritization system 501. The CFAR adaptive prioritization system 501 can select a cell under test and collect power data associated with the cell in a two-dimensional region of a range-Doppler map. CFAR adaptive prioritization system 501 may select a feature set(s) and/or feature set class associated with the cell to determine an appropriate detection threshold. The detection threshold is used to determine whether a cell is associated with a valid object or invalid object.

Detected objects may be sorted into buckets that are defined by feature set and/or figure of merit threshold. The figure of merit threshold may be determined by calculated statistical values from the results of a plurality of previous radar scans (e.g., the average Doppler value of all objects detected within a predetermined number of radar scans, optimal value, etc.). Detected objects may be assigned a score based on the bucket into which it is sorted, wherein the scores are used to prioritize (e.g., rank) the order of which points from which buckets to process. For example, in a CFAR detection output 504, a first bucket 520 may be defined by a first feature (e.g., range class 0 of 0-50 meters) and high figure of merit; a second bucket 524 may be defined as the same feature (e.g., range class 0 of 0-50 meters) and low figure of merit; a third bucket 522 may be defined as a lower priority feature (e.g., range class 1 of 51-100 meters) and high figure of merit; and a fourth bucket 526 may be defined as the same lower priority feature (e.g., range class 1 of 51-100 meters) and low figure of merit.

CFAR range-based state 506 may assess the performance of the system in sorting the detected objects into the buckets to determine whether the detection threshold, figure of merit threshold, or a combination thereof, should be updated. In an example, the figure of merit may be set as 10 dB. Only two detections from range 0-50 meters were detected having a power level above 10 dB, but 200 detections in the same range class of 0-50 meters were detected having a power level below 10 dB. Thus, the distribution of detected objects among the buckets (e.g., two detections in the first bucket 520 compared to 200 detections in the second bucket 524) indicates that the high figure of merit and lower figure of merit buckets are out of balance. Therefore, CFAR range-based state 506 make adjust the figure of merit from 10 dB to 8 dB. When CFAR range-based state 506 has ceased updating the thresholds (for example., the system has completed a specific number of iterations of a radar scan), the CFAR detection output 504 may be passed to output processing block 510 (e.g., angle of arrival processing block) for further processing.

In certain embodiments, system-level and/or platform-level constraints may be used in CFAR feature-based statistics 506 to dynamically update the detection threshold and/or figure of merit threshold. For example, an environment may have 1000 points (e.g. cells) to process, but the system state is only capable of handling 500 points under a particular time constraint. This time constraint may be used to dynamically adjust the number of points to sort into each bucket (e.g., the volume of each bucket). In another example, a certain amount of time is allotted to the system state, and the system is allowed to process a certain volume of points, but the buckets only contain two or less points. Since the system state can accommodate processing several hundred more points in the time and volume (of points to process) allotted, CFAR range-based state 506 may adjust the detection threshold and/or figure of merit threshold accordingly to detect and redistribute the points into the buckets.

Figure 6:
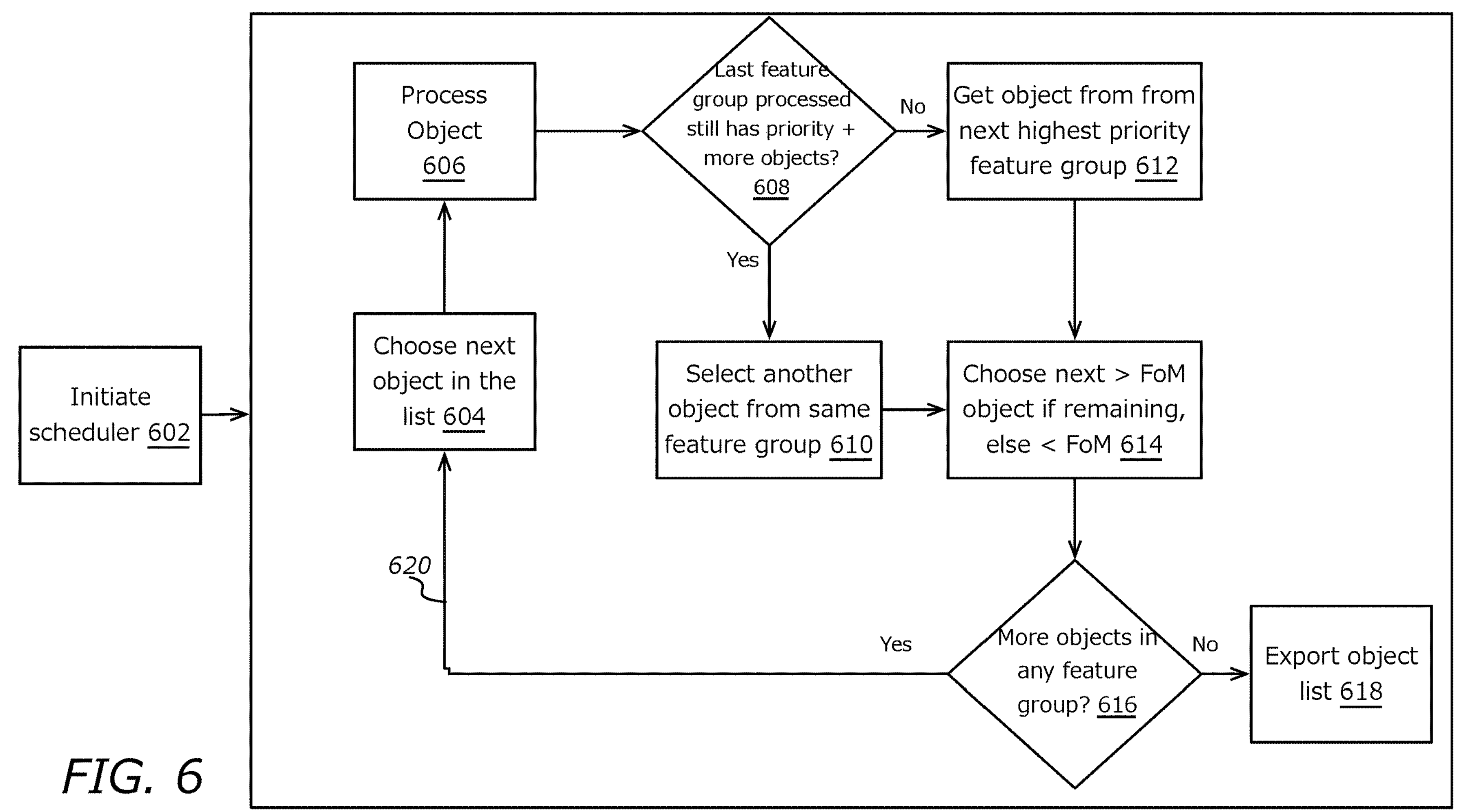
FIG. 6 illustrates an example prioritization scheduler of an adaptive prioritization system in accordance with an exemplary embodiment of the present invention.

FIG. 6 illustrates an example process of a prioritization scheduler of an adaptive prioritization system in accordance with an exemplary embodiment of the present invention. In an embodiment, scheduler 602 is initialized and begins to prioritize the detected objects. Scheduler 602 may be configured to receive an intermediate list of detected objects that have been sorted into groups (e.g., buckets defined by feature set and figure of merit). The process chooses 604 a next object in the detected objects list and processes 606 the object. The process may identify the feature and figure of merit associated with the object. The process may also assign a score to the object based on the bucket into which it was sorted. The score can be used to place the object in a prioritized index of detected objects for further processing.

The process determines 608 whether the feature group (e.g., feature set) of the object still has priority and whether there are more objects remaining in buckets associated with that feature group (e.g., buckets defined by a first feature set).

If it is determined that the feature group of the object does not have priority, the process obtains 612 another object from the next highest priority feature group.

If so, the process selects 610 another object from the buckets corresponding to the first feature set to process (e.g., score and index into a prioritized list of detected objects). The process may determine whether the object in the bucket (corresponding to the first feature set) is above the figure of merit threshold. In the example, all objects in buckets corresponding to the first feature set and which have a high figure of merit (e.g., have a power level above the figure of merit threshold) will be processed 614 first (e.g., added next in the prioritized list of detected objects). When there are no more objects in the first feature set that are above the figure of merit, the process proceeds 614 to all objects in the first feature set that are below the figure of merit.

A determination is made 616 whether additional objects in the feature set remain. In the situation where all objects associated with the first feature set (e.g., of all figure of merit values) have been processed, the process continues 620 with all objects in a second feature set with a high figure of merit, then all objects in the second feature set with a low figure of merit, and so forth. When no more objects remain, or when restricted by system-level or platform-level constraints (e.g., time constraint), the prioritized list is exported 618 for further processing.

Figure 7:
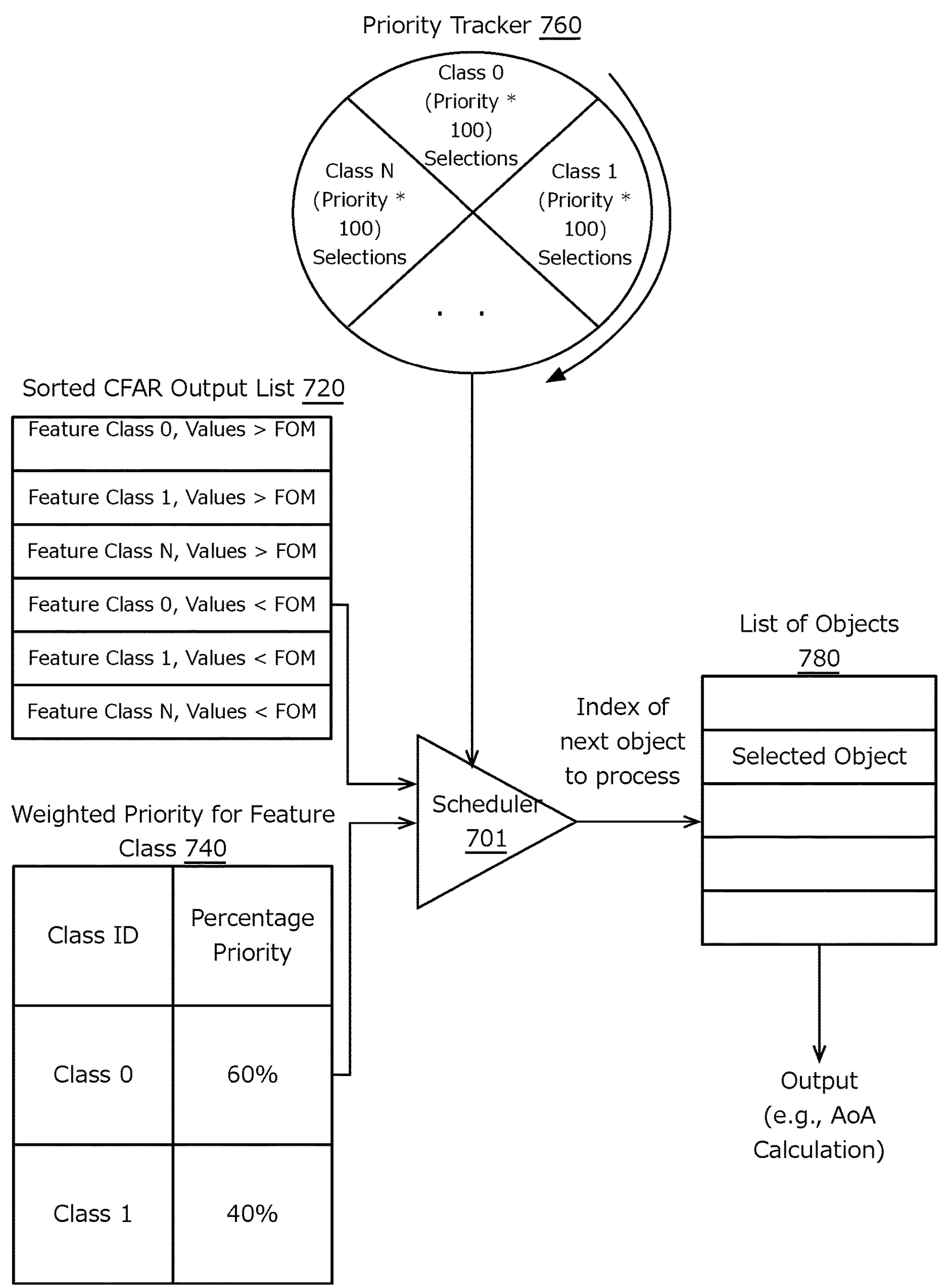
FIG. 7 illustrates another example prioritization scheduler of an adaptive prioritization system in accordance with an exemplary embodiment of the present invention.

FIG. 7 illustrates another example prioritization scheduler of an adaptive prioritization system in accordance with an exemplary embodiment of the present invention. In certain embodiments, scheduler 701 is configured to manage various components in generating a prioritized list of detected objects, which can be utilized by other systems (e.g., automated vehicle systems). Scheduler 701 may process a sorted CFAR output list 720, weighted priority for feature class 740, priority tracker 760, among other components, to generate a prioritized list of detected objects 780.

Sorted CFAR output list 720 can include a list of detected objects that are sorted into buckets. The buckets may be defined by feature set and figure of merit. For example, a first bucket may be defined for all objects associated with a feature class 0 and high figure of merit, a second bucket may be defined for all objects associated with a feature class 1 and high figure of merit, and so forth.

Weighted priority for feature class 740 may include weighting rules that are factored into determining the score to assign to each object. The weighting rules may include a hierarchy or a weighted distribution for how and when to process objects in each bucket relative to other buckets. For example, for every two objects processed from a first bucket, three objects should be processed from a second bucket (e.g., a 60/40 distribution).

In an embodiment, priority tracker 760 may include a hierarchy of buckets. In another example, priority tracker 760 may determine the volume of points within each bucket to process. The priority tracker 760 may also include a counter to track the number of points from each bucket that have been added to the queue to the prioritized list of detected objects.

Figure 8:
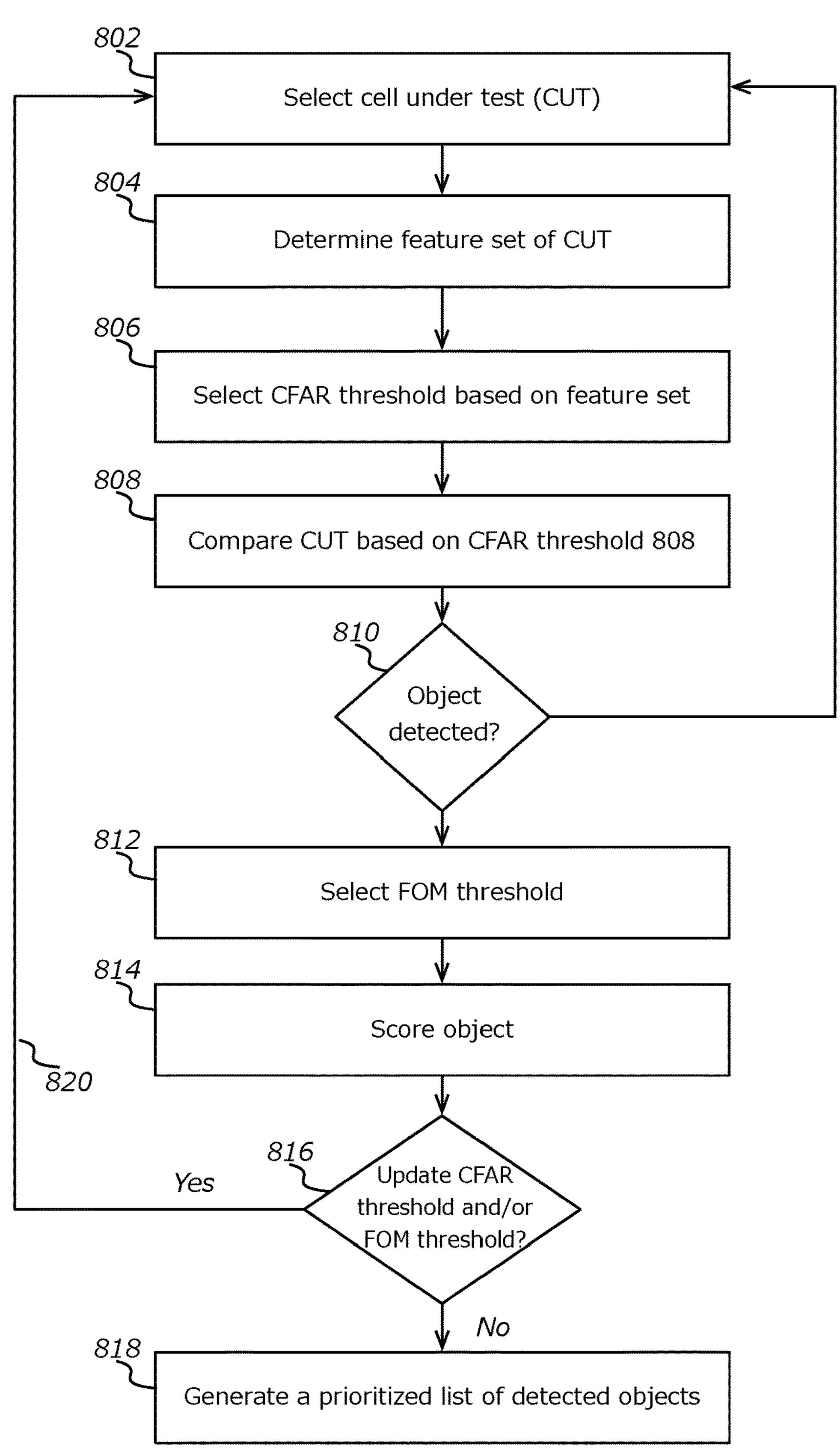
FIG. 8 illustrates an example process for adaptive prioritization of radar signal processing in accordance with various embodiments.

FIG. 8 illustrates an example process for adaptive prioritization of radar signal processing in accordance with various embodiments. In an embodiment, the process selects 802 a cell under test (CUT), from which to collect data associated with the cell in a two-dimensional region of a range-Doppler map. The cell may be associated with cell data (e.g., parameter data), which includes features. A feature is a defining characteristic of an object, such as range, Doppler level, geometric location, noise, signal-to-noise ratio (SNR), among others, or any combination thereof. The data for the CUT can be obtained through the use of range-Doppler radar values. These values are used to determine the feature set for the CUT, which specifies parameter data including range data, doppler data, SNR data, noise data, or power data.

The process can determine 804 the feature set of the cell, based on the needs of an application of the process (e.g., a system state). In an embodiment, the feature set is a set of parameters that is relevant to the object detection process and varies based on the requirements of the system. For example, if an application requires power values for each antenna at a given range and Doppler, the system may determine that the feature set is a set of range and Doppler values associated with the cell under test. In this scenario, the system state constraints, such as cycle time for processing object detection, may influence the determination of the feature set. In another example, if the system state requires segmenting objects by range, then a range-based feature may be determined to be the appropriate feature set. This means that the feature set may only include range data, which will be used to segment the objects in the cell under test.

A CFAR threshold (e.g., detection threshold) based on the feature set is selected 806 to determine whether an object is valid or invalid (e.g., detected or non-detected).

The cell under test is compared with its neighboring cells based on the selected CFAR threshold 808 to determine if the cell under test originates from a valid or invalid object. Different feature sets may require different CFAR thresholds, for example, in an application where objects are grouped into Doppler sets, Doppler is selected as the feature set, and an appropriate CFAR threshold for handling objects by Doppler values is determined. In another example, the CFAR threshold may be set as a power level, where cells emitting signals with a power level below the threshold are considered an invalid object and cells emitting signals with a power level above the threshold are considered a valid object. In another example, the CFAR threshold may be determined based on previous scans of the range/Doppler data, taking into account the system state constraints. A default CFAR threshold may be predetermined based on the selected feature set, with different values being used for different feature sets such as range, Doppler, or a combination of both.

When the signal from the cell is above the CFAR threshold, an object is detected 810.

A figure of merit threshold is selected 812 to prioritize the detected objects and is determined based on the desired application. For example, if the application requires prioritizing the objects based on Doppler levels the figure of merit threshold can be set as the average Doppler level of all objects detected in a previous scan. This average Doppler level serves as a benchmark to sort the detected objects into different groups or buckets based on their Doppler levels. In an embodiment, prioritizing objects based on their Doppler levels helps to sort the objects and make the processing of the radar data more efficient.

For example, objects that have a Doppler level higher than the figure of merit threshold (e.g., above the average Doppler level) would be sorted into a first bucket, while objects that have a Doppler level lower than the figure of merit threshold (e.g., below the average Doppler level) would be sorted into a second bucket. This grouping of objects based on their feature set and figure of merit threshold enables the system to prioritize the detected objects and make decisions accordingly. For example, by sorting the objects based on their Doppler levels, the system can focus its processing power on the objects that are most likely to be of interest first, which can improve the overall accuracy and speed of the object detection process. Additionally, sorting the objects based on Doppler levels can help to identify patterns or trends in the data, which can further improve the accuracy and efficiency of the radar system.

At step 814, the object is compared to the figure of merit threshold and assigned a score. For example, a score can be assigned to the cell based on the relationship between its power level (e.g., Cell Under Test (CUT) FOM) and the FOM threshold. The higher the power level, the higher the score assigned to the cell.

A determination is made 816 whether to update the CFAR threshold and/or figure of merit threshold. This can be based on various factors, such as changes in the environment, the presence of interference, or the need to improve system performance.

In step 818, if it is determined that the CFAR threshold and/or the FOM threshold do not need to be updated, a prioritized list of detected objects is generated. This list can be sorted based on the priority scores assigned to the cells in step 814. The prioritized list can then be fed back into the process to dynamically update the CFAR threshold and/or the FOM threshold. In step 820, if it is determined that the CFAR threshold and/or the FOM threshold need to be updated, the radar scan is fed back into the process under the updated threshold(s). The updated thresholds can then be used to reassess the detected objects and generate a new prioritized list. If the CFAR threshold and/or the FOM threshold do not need to be updated, the prioritized list of detected objects is exported for further processing, such as angle of arrival estimation or beamforming modules.

In accordance with an embodiment, to determine whether the CFAR threshold needs to be updated, the prioritized list of detected objects can be analyzed using machine learning to determine an average value of objects detected from a number of radar scans or an optimal value for the scans given the selected feature set.

One example of determining whether the CFAR threshold needs to be updated is to use machine learning algorithms on the prioritized list of detected objects from multiple radar scans. In this example, the algorithm would analyze the average value of detected objects from a number of radar scans to determine if the current CFAR threshold is accurate. If the average value falls outside of a certain range, the algorithm would suggest an updated CFAR threshold. This updated threshold would be based on an optimal value for the scans given the selected feature set, such as size, speed, and altitude of the detected objects. For example, consider a radar system installed in a self-driving car. The radar scans its surroundings for other vehicles, pedestrians, and obstacles. The CFAR threshold determines the minimum signal level required to detect an object, and a higher threshold means fewer false alarms and more missed detections. To determine whether the CFAR threshold needs to be updated, the prioritized list of detected objects can be analyzed using machine learning. The system can determine an average value of the signal level of vehicles detected in a number of radar scans, or find an optimal value for the threshold given the selected features of the vehicles (such as their size, shape, and reflectivity). The system can then update the CFAR threshold to ensure that it detects vehicles with high accuracy while minimizing false alarms.

In an embodiment, to determine whether the figure of merit threshold needs to be updated, the detected objects can be compared with the figure of merit threshold, which is determined by the CFAR feature-based statistics. The figure of merit threshold may be based on calculated statistical values from a number of previous radar scans such as the average Doppler value of all objects detected within a predetermined number of scans or an optimal value. In an embodiment, in order to determine whether the figure of merit threshold needs to be updated, the radar system can compare the detected objects with the current figure of merit threshold. If the average Doppler value of the detected objects is significantly different from the average Doppler value of the objects detected in previous scans, the figure of merit threshold may be updated. For example, if the average Doppler value of the detected objects has increased significantly, the figure of merit threshold may be adjusted to a higher value to account for the increase in speed of the vehicles. On the other hand, if the average Doppler value has decreased, the threshold may be adjusted to a lower value to reflect the decrease in speed.

Figure 9:
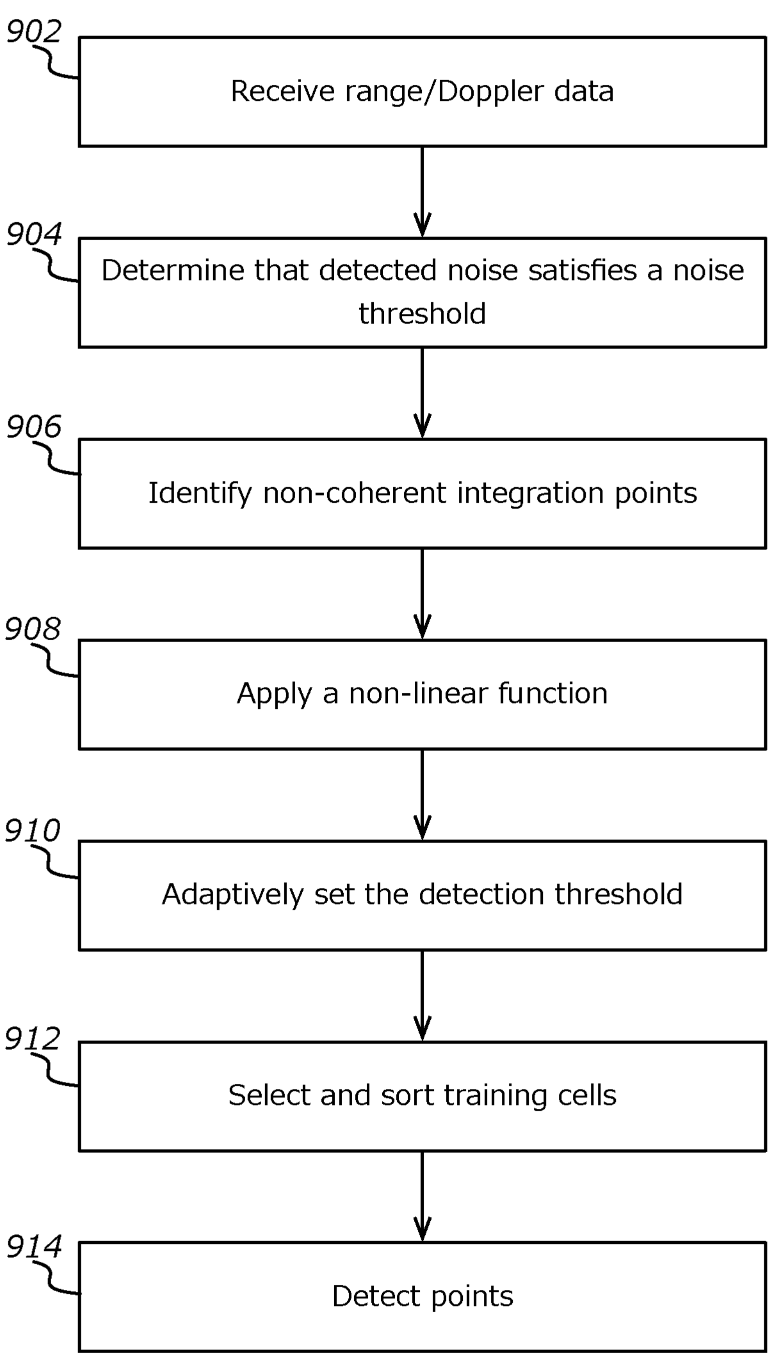
FIG. 9 illustrates an example process for utilizing a non-linear detector with adaptive thresholding in accordance with various embodiments.

FIG. 9 illustrates an example process for utilizing a non-linear detector with adaptive thresholding in accordance with various embodiments. As described, the presence of additive noise in the range-Doppler (RD) plane can pose a challenge to linear detection techniques such as CA-CFAR. This is particularly true in scenarios where interferences from other communication links and radars, or a large presence of background clutter and static objects in the scene, result in the presence of broadband, impulsive noise. In these cases, linear filters or detection techniques may not be appropriate. In this example, an adaptive CFAR prioritization system receives 902 range/Doppler data from an environment. The system selects a cell under test from the environment. For example, the system may receive a power value associated with the cell under test (e.g., CUT) in a two-dimensional region of a range-Doppler map. The cell may be associated with cell data (e.g., parameter data), which includes features. A feature is a defining characteristic of an object, such as range, Doppler level, geometric location, noise, signal-to-noise ratio (SNR), among others, or any combination thereof.

A determination is made 904 that detected noise based on the range/Doppler data satisfies a noise threshold and/or the noise is classified as other than white noise, non-coherent integration points are identified 906. In an embodiment, non-coherent integration points can refer to the multiple sample data points received by the radar system that are used to detect an object.

A non-linear function, such as the log 2 function, is applied 908 to the identified points. In an embodiment, a non-linear function can refer to logarithmic functions or other mathematical functions used to process data and extract information from it.

After the non-linear function is applied, adaptive thresholding is executed. As described herein, adaptive-thresholding refers to the process where the threshold for detecting an object is set 910 adaptively in accordance with embodiments described herein, allowing for increased precision and resistance to jamming and interference.

The training cells are selected and sorted 912. In an embodiment, selecting training cells involves identifying the neighboring cells around the cell under test (CUT) that will be used to estimate the noise power and calculate the threshold for detecting an object. In an embodiment, sorting refers to the process of organizing data in a particular order, such as sorting the noise samples in the training cells to calculate the noise estimate. The sorted data is averaged. In an embodiment, averaging on part of the sorted data refers to computing a noise estimate by taking the average of specific cells of the sorted training sequences. Points are detected 914. In an embodiment, detected points refer to the signal level that exceeds the threshold and is used to indicate the presence of an object. Thereafter, the detected objects can be processed in accordance with embodiments herein. For example, the detected objects can be compared to an appropriate FOM, and the like.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 10:
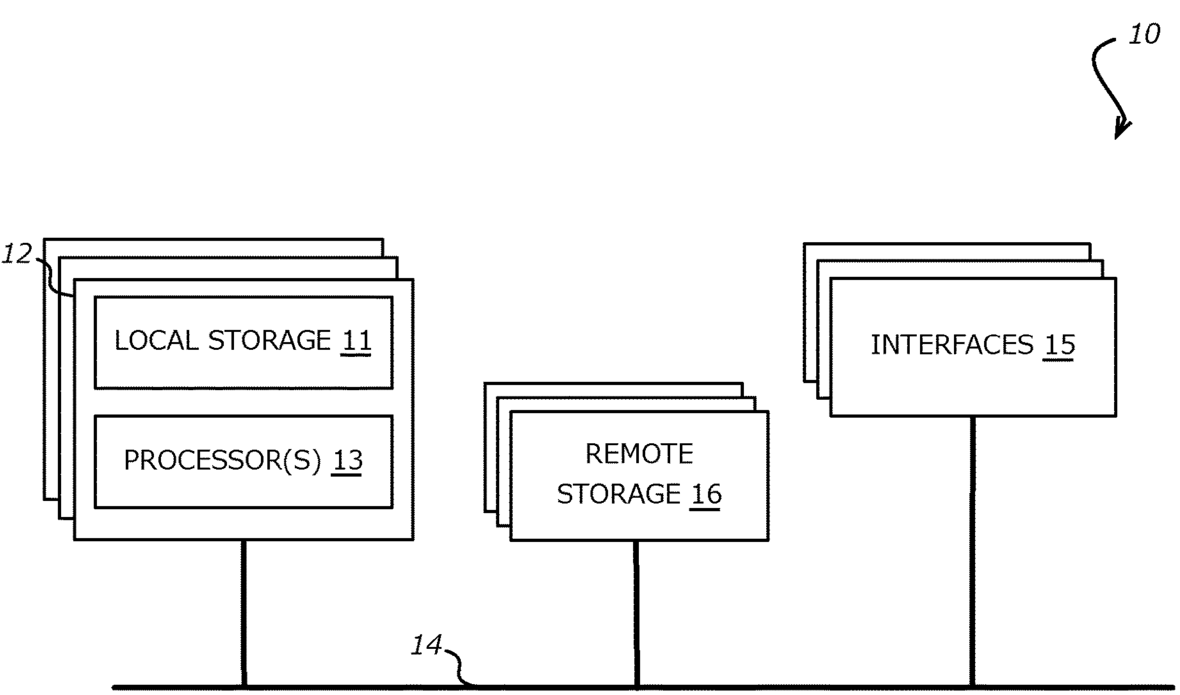
FIG. 10 illustrates a block diagram depicting an exemplary computing device that supports an embodiment of the inventive disclosure.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a JAVA virtual machine or equivalent, or files containing higher level code that may be executed by the computer using an interpreter (for example, scripts written in Python, Perl, Ruby, Groovy, or any other scripting language).

Figure 11:
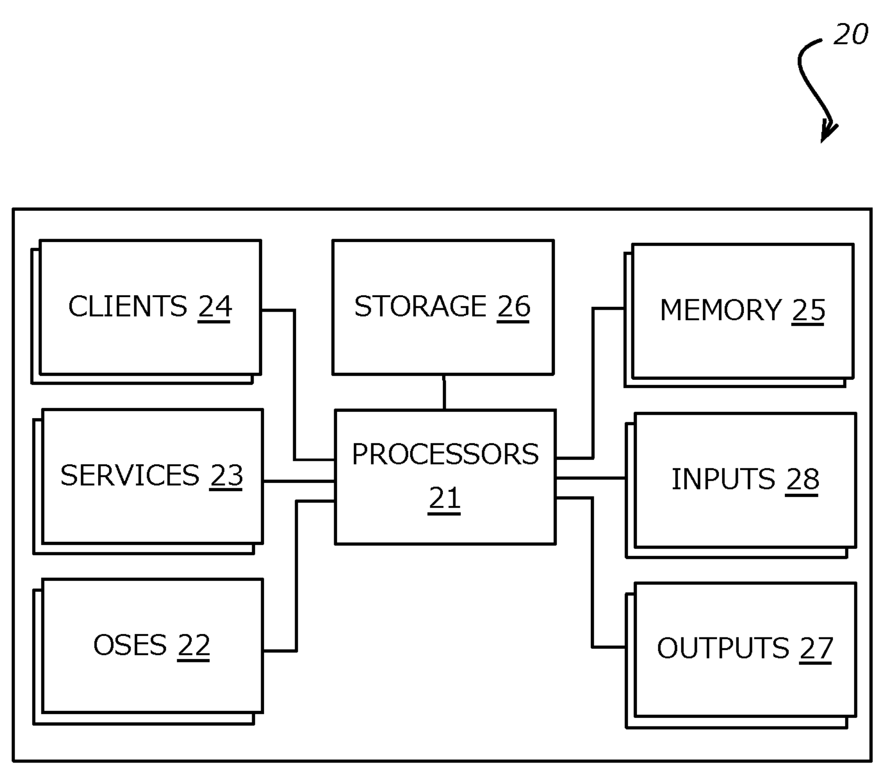
FIG. 11 illustrates an exemplary standalone computing system that supports an embodiment of the inventive disclosure.

In some embodiments, systems may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
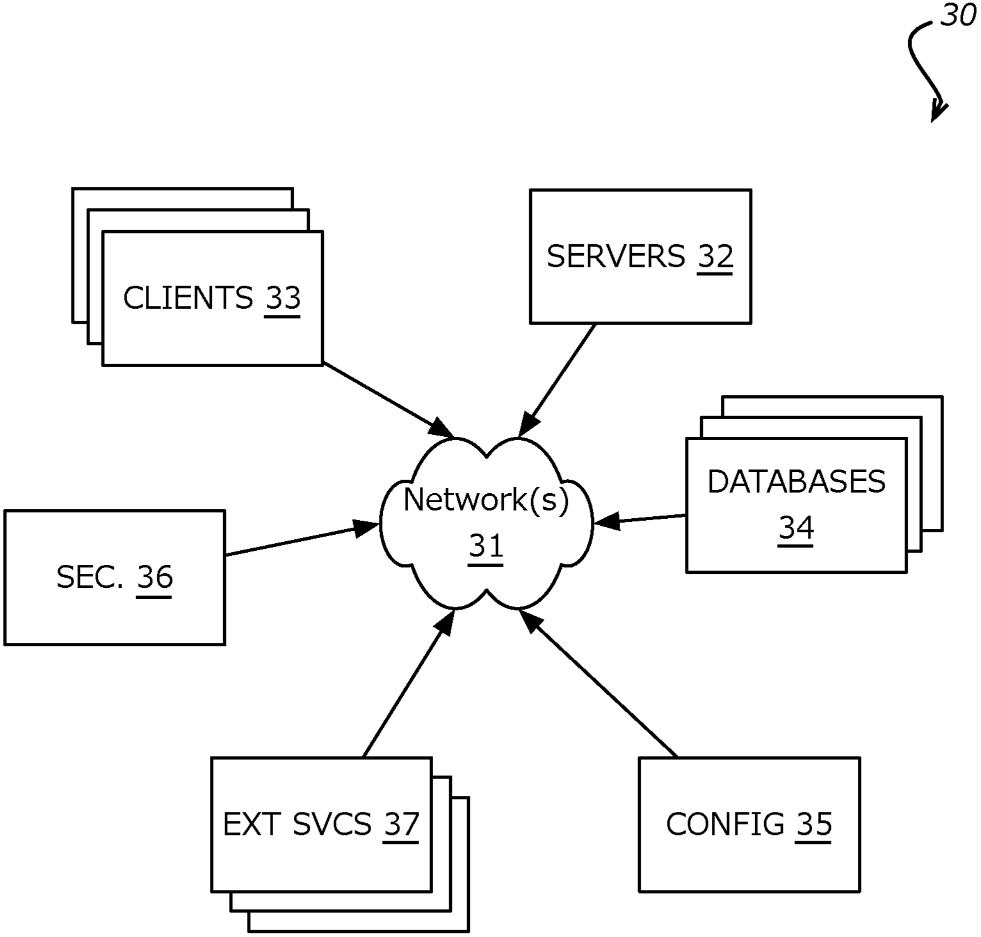
FIG. 12 illustrates an embodiment of the computing architecture that supports an embodiment of the inventive disclosure.

In some embodiments, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 13:
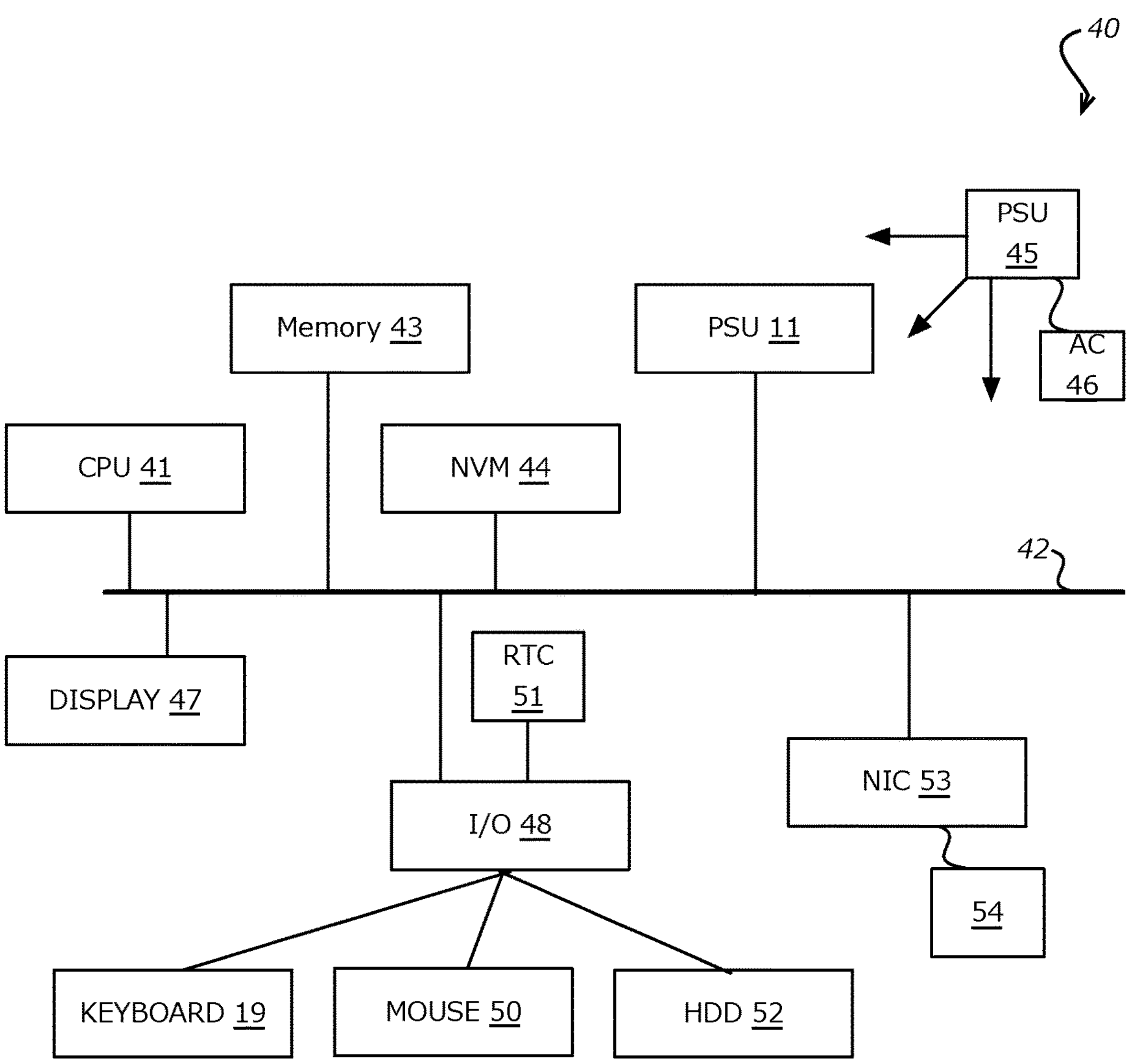
FIG. 13 illustrates an exemplary overview of a computer system that supports an embodiment of the inventive disclosure.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A radar system for performing object detection on a cell under test (CUT) associated with range-Doppler radar values, comprising:

a computing device processor; and a memory device including instructions that, when executed by the computing device processor, enables the radar system to:

determine a feature set for the cell under test, the cell under test associated with a plurality of cells, the feature set specifying parameter data including at least one of range data, doppler data, signal-to-noise ratio (SNR) data, noise data, or power data;

select a baseline detection threshold based on the feature set;

analyze parameter data associated with the cell under test with respective parameter data associated with neighboring cells to generate detected unit data indicative of an object detection;

compare the detected unit data to the baseline detection threshold to determine whether the cell under test corresponds to a valid object;

compare the detected unit data to a figure of merit comprising a threshold derived from statistical aggregation of prior radar scan outputs to generate a priority score indicative of detection confidence;

assign the priority score to the detected unit data;

sort the detected unit data based on the priority score to generate a sorted list of detected unit data, wherein the sorted list of detected unit data is partitioned into a plurality of buckets defined jointly by the feature set and the figure of merit;

prioritize the detected unit data using a scheduler that weights factors comprising an order of processing buckets defined by at least one of the feature set or the figure of merit, a weighted distribution among the buckets, and a volume of detected unit data within each bucket to be processed;

update the baseline detection threshold based on the sorted list, wherein the update is performed based on distribution of detected unit data across the plurality of buckets and system-level processing constraints; and use the feature set associated with the sorted list of detected unit data for further processing.

2. The radar system of claim 1, wherein the figure of merit is updated based on radar system constraints including environment considerations, and wherein the figure of merit is jointly tuned with the baseline detection threshold based on statistical aggregation of prior radar scan outputs.

3. The radar system of claim 2, wherein the radar system constraints include a processing capacity constraint defining a maximum number of detected unit data items per radar scan cycle.

4. The radar system of claim 3, wherein the processing capacity constraint is used by the scheduler to dynamically adjust a volume of detected unit data assigned to each bucket in the plurality of buckets.

5. The radar system of claim 1, wherein the scheduler further comprises a priority tracker configured to maintain a hierarchy of the plurality of buckets, and to determine a volume of detected unit data within each bucket in the plurality of buckets based on the hierarchy.

6. The radar system of claim 5 wherein the priority tracker further comprises a counter configured to track a number of detected unit data items from the each bucket that are added to a prioritized processing queue.

7. The radar system of claim 1 wherein the instructions, when executed by the computing device processor, further enables the radar system to:

use a machine learning based approach to determine the baseline detection threshold for the feature set and the figure of merit based on prior radar scans and detected object distribution statistics.

8. A computer-implemented method for performing object detection using a radar system on a cell under test associated with range-Doppler radar values, comprising:

obtaining radar data for performing object detection on a cell under test (CUT), the radar data associated with range-Doppler radar values;

determining a feature set for the cell under test, associated with multiple cells, the feature set specifying parameter data including at least one of range data, doppler data, SNR data, noise data, or power data;

selecting a baseline detection threshold based on the feature set;

analyzing parameter data of the cell under test and neighboring cells to generate detected unit data indicating object detection;

detecting an object by comparing the detected unit data to the baseline detection threshold to determine whether the cell under test corresponds to a valid object detection outcome;

generating a priority score by comparing the detected unit data to a figure of merit comprising a threshold derived from statistical aggregation of prior radar scan outputs, the priority score being indicative of detection confidence;

assigning the priority score to the detected unit data;

sorting the detected unit data based on the priority score to form a sorted list, wherein the sorted list is partitioned into a plurality of buckets defined jointly by the feature set and the figure of merit;

prioritizing the detected unit data using a scheduler that weights factors comprising an order of processing buckets defined by the feature set and the figure of merit, a weighted distribution among the buckets, and a volume of detected unit data within each bucket to be processed; and updating the baseline detection threshold using the sorted list based on a distribution of detected unit data across the plurality of buckets and system-level processing constraints.

9. The computer-implemented method of claim 8, further comprising:

updating the figure of merit based on radar system constraints including environment considerations, wherein the figure of merit is jointly tuned with the baseline detection threshold based on statistical aggregation of prior radar scan outputs.

10. The computer-implemented method of claim 9, wherein the radar system constraints include a processing capacity constraint defining a maximum number of detected unit data items per radar scan cycle.

11. The computer-implemented method of claim 8, further comprising:

updating one of the baseline detection threshold or the figure of merit to satisfy a system performance metric, wherein the system performance metric is associated with distribution of detected unit data across the plurality of buckets.

12. The computer-implemented method of claim 11, wherein the system performance metric includes an amount of detected objects.

13. The computer-implemented method of claim 8, further comprising:

processing detected unit data satisfying a priority score threshold determined dynamically based on distribution of detected unit data across the plurality of buckets and system-level processing constraints.

14. The computer-implemented method of claim 8, further comprising:

using a machine learning based approach to determine the baseline detection threshold for the feature set and the figure of merit based on prior radar scan distributions.

15. A non-transitory computer readable storage medium storing instructions that, when executed by at least one processor of a computing system, causes the computing system to:

obtain radar data for performing object detection on a cell under test (CUT), the radar data associated with range-Doppler radar values;

determine a feature set for the cell under test, associated with multiple cells, the feature set specifying parameter data including at least one of range data, doppler data, SNR data, noise data, or power data;

select a baseline detection threshold based on the feature set;

analyze parameter data of the cell under test and the neighboring cells to generate detected unit data indicating object detection;

detect an object by comparing the detected unit data to the baseline detection threshold;

generate a priority score by comparing the detected unit data to a figure of merit, the priority score being indicative of detection confidence;

assign the priority score to the detected unit data;

sort the detected unit data based on the priority score to form a sorted list, wherein the sorted list is partitioned into a plurality of buckets defined jointly by the feature set and the figure of merit;

prioritize the detected unit data using a scheduler that weights factors comprising an order of processing buckets defined by at least one of the feature set or the figure of merit, a weighted distribution among the buckets, and a volume of detected unit data within each bucket to be processed, wherein the scheduler further comprises a priority tracker configured to maintain a hierarchy of the plurality of buckets and to determine the volume of detected unit data within each bucket to be processed based on the hierarchy; and update the detection threshold using the sorted list of detected unit data.

16. The non-transitory computer readable storage medium of claim 15, wherein the instructions, when executed by the at least one processor, further enables the computing system to:

update the figure of merit based on radar system constraints including environment considerations, and wherein the figure of merit is jointly tuned with the baseline detection threshold based on statistical aggregation of prior radar scan outputs.

17. The non-transitory computer readable storage medium of claim 16, wherein the radar system constraints include a processing capacity constraint defining a maximum number of detected unit data items per radar scan cycle.

18. The non-transitory computer readable storage medium of claim 15, wherein the priority tracker further comprises a counter configured to track a number of detected unit data items from the each bucket that are added to a prioritized processing queue.

19. The non-transitory computer readable storage medium of claim 18, wherein the instructions, when executed by the at least one processor, further enables the computing system to dynamically update the baseline detection threshold and the figure of merit based on a system performance metric.

20. The non-transitory computer readable storage medium of claim 15, wherein the instructions, when executed by the at least one processor, further enables the computing system to:

process detected unit data satisfying a priority score threshold.

* * * * *